United States Patent Office 3,246,017
Patented Apr. 12, 1966

3,246,017
3α-AMINOANDROST-5-ENE 17β-CARBOXYLIC ACID AND DERIVATIVES THEREOF
Leslie A. Freiberg, Waukegan, and John Wayne Cole, Deerfield, Ill., assignors to Abbott Laboratories, North Chicago, Ill., a corporation of Illinois
No Drawing. Filed June 10, 1964, Ser. No. 374,153
5 Claims. (Cl. 260—397.1)

The present invention relates to new steroids; more particularly, it relates to 3α-aminoandrost-5-ene-17β-carboxylic acid and the corresponding alkyl esters and N-substituted derivatives.

The new steroids are represented by the general formula

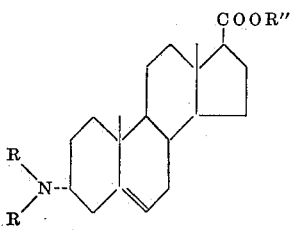

wherein R is hydrogen, loweralkyl, or a fatty acid acyl group and wherein R' and R" are hydrogen or loweralkyl.

The compounds of the present invention are useful as growth-regulating agents; particularly, they stimulate the growth of the thyroid gland in warm-blooded animals. The new compounds also posses anti-androgenic activity of the type described by Dorfman in Acta Endocrinologica, volume 33, page 308 (1960).

The new compounds are made by preparing an alkylsulfonoxy or arylsulfonoxy derivative of 3β-hydroxyandrost-5-ene-17β-carboxylic acid esters, heating said 3-alkyl-(or aryl)-sulfonoxy compounds with an alkali metal azide in an inert solvent and, after separating the 3α-azidoandrost-5-ene-17β-carboxylic acid ester from the reaction mixture, the 3-azido group is converted to the 3α-amino group by reduction in a well known manner. The above reference to "inert" means that the solvent used is neutral, anhydrous, and does not react with either reactant or the formed reaction products. The above reference to "heating" means that the reaction between the axide salt and the 3β-sulfonoxy steroid is carried out at elevated temperature, e.g., about 50° C. The elevated temperature for the reaction is preferably maintained for at least 1 hour, although considerable amounts of the desired 3α-axido steroid form within a few minutes at temepratures of 80–100° C. The reduction of the 3α-azido group to the corresponding amino group can be done in any known way, e.g., by treating the azido compound with zinc and acetic acid, by hydrogenation using a mild catalyst or even electrolytically.

The obtained 3α-amino compound can easily be converted into the analogous acylamino, alkylamino, dialkylamino, or N-acyl-N-alkylamino derivatives through methods well accepted in the art, e.g., to the 3α-acylamino compounds by treating the amino compound with an acyl chloride or a fatty acid anhydride; the alkylated derivatives can be made by known methods, e.g., by first making a Schiff base with an aliphatic aldehyde and subsequently partially hydrogenating the latter using Raney nickel as the catalyst. Subsequent reaction with an acyl chloride or a fatty acid anhydride can be used to prepare the N-alkylacylamino compounds.

It will be apparent to those skilled in the art that the above esters can be saponified to the corresponding 17β-carboxy derivatives and the carboxy derivatives can be esterified, in turn, with any desired loweralkyl alcohol to the corresponding alkyl esters.

To illustrate the preparation of the new compounds of the present invention, reference is made to the following examples which are not intended to limit the invention in any respect. In these examples, wherever reference is made to a mixture of solvents and no ratio of such solvent is given, it is to be understood that the first solvent named is used to dissolve the material to make a concentrated solution, and the second solvent is then added to induce or complete crystallization.

*Example 1.—3α-azido-17β-carbomethoxyandrost-5-ene*

To a solution of 40 grams of sodium axide in 450 ml. of anhydrous dimethylsulfoxide heated to 85° C. is added 7.0 grams of 3β-p-toluenesulfonoxy-17β-carbomethoxyandrost-5-ene. The mixture is maintained with occasional swirling at 85° C. for 2 hours. The warm reaction mixture is then poured into 3.0 liters of water and the product is extracted with ether. The ether is washed with water, dried with anhydrous magnesium sulfate, and evaporated. The product, 3α-azido-17β-carbomethoxyandrost-5-ene is crystallized from methanol to give 1.89 grams of the pure compound melting at 180–185° C. After recrystallization from methanol, it shows a melting point of 187–188.5° C. and its analytical values correspond closely to those calculated for the compound of empirical formula $C_{21}H_{31}N_3O_2$.

The starting material used above is obtained by reacting the corresponding 3β-hydroxy compound with p-tolenesulfonyl chloride as described in Helv. Chim. Acta, volume 29, page 671 (1946). When in the preparation of the starting material the p-toluenesulfonyl chloride is replaced by an alkanesulfonyl chloride, 3β-alkanesulfonoxy-17β-carbomethoxyandrost-5-ene is obtained and can be substituted for the above starting material to obtain an equal yield of 3α-azido-17β-carbomethoxyandrost-5-ene as obtained above.

*Example 2.—3α-amino-17β-carbomethoxyandrost-5-ene and N-alkyl derivatives* a)( To a suspension of 2.01 grams of 3α-azido-17β-carbomethoxyandrost-5-ene in 140 ml. of glacial acetic acid/ethyl ether (1:1), 5.0 grams of acid washed electrolytic zinc sponge is added in portions over a period of 1 hour. The mixture is stirred another hour and the zinc is then removed by filtration. The filter cake is washed with a small amount of the above solvent mixture and the wash liquor is combined with the filtrate. The filtrate is evaporated in vacuo to remove all of the ethyl ether and the residual acetic acid solution is poured into 500 ml. of water which is then made alkaline by adding potassium hydroxide. The desired product is extracted with ether and the ether is washed with 10% potassium hydroxide and subsequently with water. The ether is dried with anhydrous magnesium sulfate and evaporated, giving 1.70 grams of crude 3α-amino-17β-carbomethoxyandrost-5-ene, melting at 125–140° C. Purification of this product is effected by absorbing 300 mg. thereof dissolved in 10 ml. of benzene onto 30 grams of a chromatographic column filled with magnesium silicate activated as described in U.S. 2,393,625. Elution of the material is begun with benzene, followed by gradient elution with benzene/methanol. The major consecutive fractions are combined, evaporated and the residue is sublimed at 120–130° C. and 0.5 mm. pressure to give 140 mg. of 3α-amino-17β-carbomethoxyandrost-5-ene melting at 154–158° C. Crystallization from methanol/water produces 114 mg. of the pure compound melting at 158–159.5° C. The analytical values are in close agreement with the values calculated for the compound of empirical formula $C_{21}H_{33}NO_2$ (b) A solution of 50 mg. of 3α-amino-17β-carbomethoxyandrost-5-ene, 20 ml. of ethanol, and 15 mg. of acetaldehyde is hydrogenated at room temperature and atmospheric pressure in a Parr shaker after adding 10 mg. of Raney nickel. After absorption of one molar equivalent of hydrogen, the mixture is filtered and the filtrate is evaporated. From the residue, 3α-ethylamino-17β-carbomethoxyandrost-5-ene is obtained of which an analytical sample is in agreement with the values calculated for the compound of the formula $C_{23}H_{37}NO_2$. Alternatively, the Shiff base resulting from the above reaction with acetaldehyde may be reduced directly with sodium borohydride in methanol solution at room temperature.

(c) A solution of 200 mg. of 3α-amino-17β-carbomethoxyandrost-5-ene in 25 ml. of methanol containing 0.1 ml. of concentrated hydrochloric acid is stirred with excess formaldehyde and zinc dust according to the process of Wagner as described in Organic Reactions, 4, page 198 (1948, John Wiley & Sons). The crude dimethylamino ester solution is evaporated, cooled, and then shaken with ether and cold dilute sodium hydroxide to separate an ether solution of the product. The ether solution is washed with sodium hydroxide solution, followed by water, and then concentrated to give the 3α-dimethylamino - 17β - carbomethoxyandrost-5-ene of the formula $C_{23}H_{37}NO_2$.

*Example 3.—3α-amino-17β-carboxyandrost-5-ene*

To a solution of 536 mg. of 3α-amino-17β-carbomethoxyandrost-5-ene melting at 154–158° C. in 40 ml. of methanol is added 10 ml. of water containing 0.9 gram of potassium hydroxide. After refluxing the mixture overnight, it is cooled, filtered, and the methanol is removed from the filtrate in vacuum. A small amount of methanol is then added again to redissolve the precipitate and the solution is neutralized with 1.0 N hydrochloric acid. The crystals of 3α-amino-17β-carboxyandrost-5-ene are collected and dried at 60° and 1.0 mm. pressure to produce a yield of 421 mg. of crude product. Sublimation of 200 mg. at 250° C. and 0.5 mm. pressure produces 95 mg. of pure 3α-amino-17β-carboxyandrost-5-ene melting at 330–335° C. in a sealed, evacuated capillary. The analytical values are in close agreement with the values calculated for the compound of the formula $C_{20}H_{31}NO_2$.

*Example 4.—3α-acetamido-17β-carbomethoxyandrost-5-ene*

To a solution of 366 mg. of 3α-amino-17β-carbomethoxyandrost-5-ene in 16 ml. of pyridine is added 8 ml. of acetic anhydride and the mixture is allowed to stand at 25° C. overnight. The reaction mixture is then poured onto ice and the product is extracted with ether. The ether extracts are washed with 3 N hydrochloric acid, 10% sodium hydroxide, and finally with water. The ether is dried with anhydrous magnesium sulfate and is evaporated, giving 262 mg. of crude product. Recrystallization of this product from benzene/hexane gives 132 mg. of 3α-acetamido-17β-carbomethoxyandrost-5-ene melting at 225–227° C. The analytical values obtained are in agreement with those calculated for the compound of empirical formula $C_{23}H_{35}NO_3$.

By replacing the above acetic anhydride with propionic anhydride, the corresponding 3α-propionamide is obtained in a similar yield.

When 3α-ethylamino-17β-carbomethoxyandrost-5-ene is used in the above procedure with pyridine and acetic anhydride, 3α-N-ethyl - N - acetylamino - 17β - carbomethoxyandrost-5-ene is obtained.

*Example 5.—3α-acetamido-17β-carboxyandrost-5-ene*

To a solution of 218 mg. of 3α-amino - 17β - carboxyandrost-5-ene in 9.5 ml. of pyridine is added 7.5 ml. of acetic anhydride, and the mixture is allowed to stand overnight at 25° C. The reaction mixture is then poured onto cracked ice and the product is dissolved in chloroform and washed with 3 N hydrochloric acid and water. The chloroform solution is dried with anhydrous magnesium sulfate and evaporated to give crude 3α-acetamido-17β-carboxyandrost - 5 - ene which is recrystallized from methanol/water to give 181 mg. of the pure product melting at 296–298° C. (decomposition) in a sealed, evacuated capillary. The analytical values are in close agreement with those calculated for the compound of empirical formula $C_{22}H_{33}NO_3$.

It will be apparent to those skilled in the art that other derivatives falling within the above-defined class of new compounds can be made in analogous processes. For instance, all the 3α - loweralkyl-amino-17β-carbomethoxy- (or carboxy)-androst-5-enes can be made by following the procedure outlined above and that described in Organic Reactions, vol. IV, page 196 ff. (John Wiley & Co., 1948). Similarly, other 3α-acylamino derivatives can be made by using longer fatty acid anhydrides or halides in the reaction with the 3α-amino compounds defined above.

The 3α-azido compounds are best prepared by heating the 3β-alkyl-(or aryl)-sulfonoxy compounds and the alkali azide to temperatures between 30° and 150° C. Instead of sodium azide, lithium azide or potassium azide can be used and the dimethylsulfoxide may be replaced by N-methylacetamide and similar inert, anhydrous solvents.

Others may practice the invention in any of the numerous ways which will be suggested to those skilled in the art by the present disclosure. All such practice of the invention is considered a part hereof, provided it falls within the scope of the appended claims.

We claim:
1. A steroid of the formula

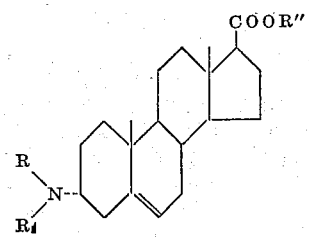

wherein R is selected from the group consisting of hydrogen, A and ACO, and wherein R' and R" are selected from the group consisting of hydrogen and A, A being loweralkyl.

2. 3α-amino-17β-carbomethoxyandrost-5-ene.
3. 3α-amino-17β-carboxyandrost-5-ene.
4. 3α-acetamido-17β-carbomethoxyandrost-5-ene.
5. 3α-acetamido-17β-carboxyandrost-5-ene.

References Cited by the Examiner

UNITED STATES PATENTS

| | | | |
|---|---|---|---|
| 2,853,486 | 9/1958 | Sarett et al. | 260—239.5 |
| 3,169,093 | 2/1965 | Davis | 167—65 |

LEWIS GOTTS, *Primary Examiner.*

HENRY A. FRENCH, *Assistant Examiner.*